United States Patent Office 3,532,554
Patented Oct. 6, 1970

3,532,554
CELL WITH PEROXYMONOSULFATE DEPOLARIZER
Bernard Cohen and Paul R. Mucenieks, Trenton, N.J., assignors to FMC Corporation, New York, N.Y., a corporation of Delaware
No Drawing. Filed Nov. 25, 1968, Ser. No. 778,838
Int. Cl. H01m 15/00, 17/00
U.S. Cl. 136—100          5 Claims

ABSTRACT OF THE DISCLOSURE

This specification discloses improved primary electric cells comprising a zinc, zinc-base alloy, magnesium or magnesium-base alloy negative electrode, and a positive electrode in contact with an ionizable depolarizer in which the improvement comprises using as depolarizer an ionizable peroxymonosulfate.

CROSS REFERENCE TO RELATED APPLICATIONS

This application is related to application Ser. No. 778,837, "Cell With Peroxydiphosphate Depolarizer," filed on behalf of Paul R. Mucenieks, Bernard Cohen, and Leonard R. Darbee, and application Ser. No. 778,619, "Cell With Peroxydisulfate Depolarizer," filed on behalf of Bernard Cohen and Paul R. Mucenieks, both applications being filed on even date herewith.

BACKGROUND OF THE INVENTION

Field of the invention

Primary electric cells using an ionizable peroxymonosulfate as a depolarizer.

Description of the prior art

Primary electric cells for the production of electricity, having two electrodes, one negative electrode which is oxidized and one positive electrode which is reduced, have long been known. Typical negative electrode materials include zinc, zinc-base alloys, magnesium, magnesium-base alloys and the like. Typical positive electrodes include carbon, graphite, platinum, steel and the like.

The electrical output of a primary cell can be increased by improving the oxidizing agent at the positive electrode. The oxidizing action is more commonly known as depolarizing action. Materials that improve the oxidizing action, depolarizers, greatly increase the current output of primary electric cells.

The use of primary electric cells, or primary batteries, has increased spectacularly with the increased use of transistor radios, portable television sets and the like. The most prominent types of batteries in service today are the zinc-carbon, alkaline-manganese, and mercury batteries. The zinc-carbon primary electric cells using manganese dioxide as the material to be reduced, i.e., the depolarizer, account for 80% of the primary batteries.

The unrivaled virtue of the zinc-carbon battery is its low cost. The zinc-carbon primary cell has disadvantages in that it produces variable voltages of function of current drain, and has a rather poor shelf life when stored at elevated temperatures. The low cost of these cells is principally due to the fact that suitable quality manganese dioxide is currently mined from the earth at relatively low cost. The substitution of electrolytic manganese dioxide for the natural material, although it greatly improves the cell, will greatly increase the cost of the cell. Alkaline-manganese and mercury batteries are better though more expensive than zinc-carbon batteries.

Other primary electric cells include silver-zinc, silver-cadmium, thermal and activated ammonium, nickel-iron, Lelande batteries, air cells, water-activated cells and a considerable number of miscellaneous special cells that are occasionally manufactured for special applications. The water-activated primary electric cells are capable of powering small radio transmitters and the like. They typically use silver-chloride or cuprous chloride as depolarizer. These batteries can become activated when sea water enters the space between the electrodes, for example, when a battery is dropped into the ocean from an aircraft. The silver chloride and cuprous chloride batteries are rather expensive and good, reliable, low-cost primary electric cells activated by liquids are in demand.

Primary electric cells using relatively inexpensive peroxydisulfates have been developed. However, peroxydisulfates corrode zinc and magnesium electrodes. The result of this corrosive attack is that primarily heat energy rather than electrical energy is produced by cells using peroxydisulfate depolarizer. Primary electric cells have been developed using peroxydisulfate depolarizers, and a rather expensive diaphragm to prevent excessive attack of the negative electrode material, so that an electrochemical rather than a chemical reaction occurs. The diaphragm adds materially to the cost and complexity of the cell. Silver catalysts have been used with peroxydisulfate depolarizers with good results; however, silver is a very expensive additive and its cost is prohibitive except in special applications. Our related patent application Ser. No. 778,619, "Cell With Peroxydisulfate Depolarizer," filed on even date herewith, describes a method of reducing or eliminating the corrosive action of peroxydisulfate.

SUMMARY OF THE INVENTION

We have now discovered that primary electric cells can be made which employ ionizable peroxymonosulfates as depolarizers, a zinc or zinc-base alloy, magnesium or magnesium-base alloy negative electrode and a positive electrode. These cells have higher storage capacity than cells made with peroxydisulfate depolarizers and they have an unusually high potential. The peroxymonosulfate attacks both the zinc and the magnesium metals which are used as electrode materials. This attack can be stopped by use of a diaphragm so that an electrochemical rather than a chemical reaction takes place at the negative electrode. The corrosive attack can also be stopped or greatly reduced by adding an ionizable phosphate to the peroxymonosulfate depolarizer. Thus, the cell may be operated either with or without a cell diaphragm such as a cation exchange membrane.

These new primary cells employing peroxymonosulfate as depolarizers give usually high potential for an aqueous system when magnesium is used as the negative electrode; voltages on the order of 2.3 to 2.5 volts at a 2.5 milliampere/cm.$^2$ current density are produced. There is no current lag going from an open to a closed circuit when using magnesium as the negative electrode. This is quite surprising as heretofore a significant amount of time elapsed between the time a "magnesium battery" was turned on and current began to flow.

DESCRIPTION OF THE INVENTION AND THE PREFERRED EMBODIMENTS

Ionizable peroxymonosulfates were found to be suitable depolarizers for use in primary electric cells employing zinc, zinc-base alloy, magnesium or magnesium-base alloy negative electrode materials. Any of the ionizable peroxymonosulfates, such as the peroxymonosulfates of potassum, sodium, ammonium, lithium, may be used as depolarizers. Potassium peroxymonosulfate is preferred as it is a satisfactory depolarizer and is readily available. The peroxymonosulfate may be used in a solution or loaded in a cell as a solid to which cell the conducting liquid is added.

The preferred peroxymonosulfate depolarizers contain an ionizable phosphate to control negative electrode corrosion. The phosphates used in practicing this invention are those compounds which have phosphorus in the anions where each atom of phosphorus is surrounded by four oxygen atoms arranged at corners of a tetrahedron. By sharing oxygen atoms between tetrahedra, chains, rings, and branched polymers of interconnected $PO_4$ tetrahedra can be produced. Useful phosphates include, but are not limited to, orthophosphates, pyrophosphates, perphosphates such as peroxydiphosphates, polymeric phosphates, such as tripolyphosphates and the like. Orthophosphates, pyrophosphates, and peroxydiphosphates were found effective, from trace amounts of about 0.1% to about 30% by weight, based on the peroxymonosulfate, in stopping corrosion of the electrodes.

With magnesium electrodes the orthophosphates produce the best results. As low as 0.1% of an orthophosphate produces a noticeable effect in reducing corrosion of magnesium electrodes; however, commercially useful effects are demonstrated at levels of about 1% orthophosphate based on the weight of the peroxymonosulfate. Preferably the orthophosphates are used in amounts of about 3% by weight. Although the orthophosphates react with peroxymonosulfates, neither the reaction nor the reaction products interfere in any way with the use of mixtures of peroxymonosulfates and orthophosphates as depolarizers. Pyrophosphates and peroxydiphosphates can be used at levels at about 4–5% based on the weight of peroxymonosulfate to reduce corrosion of magnesium electrodes.

Orthophosphates, pyrophosphates, and peroxydiphosphates were found effective in from trace amounts of about 0.1% up to about 30% by weight based on peroxymonosulfate in reducing the corrosive attack of peroxymonosulfate depolarizers on zinc electrodes. Preferably these phosphates are used in amounts of less than 1% with zinc electrodes. The amount of phosphates in the depolarizers should not exceed 30% of the peroxymonosulfate, by weight, as all cell action can be stopped, apparently by phosphatizing either zinc or magnesium electrodes.

In a typical example of a cell containing a diaphragm, a cation-exchange membrane is formed in the shape of a cylinder that is sealed at the bottom. The depolarizer mass is compressed into the cylinder around an inert positive electrode, such as a carbon rod, which is arranged in the cylinder. The filled diaphragm or membrane cylinder is closed at the top and this assembly is then placed in a cell, such as a zinc can or beaker. The diaphragm assembly is centered in the cell and sealed at the top. The cell is activated by adding a conducting liquid, such as a solution of potassium chloride in water to the cell. By conducting liquid, we mean liquids that conduct, such as electrolytes, and liquids which form a conducting solution when placed in a cell containing a depolarizer.

The primary electric cells of this invention may be operated by placing the electrodes directly into a solution of the depolarizer, by adding water or an appropriate conducting liquid to a cell containing solid depolarizer and appropriate electrodes, or by impregnating a carrier such as paper or a similar non-metallic material with a depolarizer, and wetting the carrier with a conducting liquid either before or after insertion between the proper electrodes. The cells may be contained in any suitable inert material such as glass, plastic and the like or electrode material, such as a zinc can, may contain the cell.

The depolarizer may be in the form of an intimate mixture of peroxymonosulfate and an ionizable phosphate in a finely divided form, or the depolarizer may be impregnated into a carrier such as paper or other non-metallic materials. These depolarizer compositions are portable, stable when dry, and show little deterioration during storage. Neither the depolarizers nor the products of the exhausted cells are toxic.

Many additives, well known in the art of battery making, for improving the operation of primary electric cells are useful with the depolarizers of this invention. Conductivity aids, such as acetylene black, carbon black, and graphite, binders, oxidation controllers, inhibitors, buffers, catalysts or activation agents, viscosity modifiers, surfactants, rare earths, mercuric chloride and potassium dichromate are all well known in the art to be useful in depolarizers.

The following examples illustrating the novel primary electric cells disclosed herein are given without any intention that the invention be limited hereto. All parts and percentages, unless otherwise noted, are by weight.

*Example 1.*—One milliliter of a solution made of 3.5 g. $KHSO_5$, 1 g. $K_4P_2O_7$ and 6 g. $H_2O$ was placed in a cell between a zinc and a platinum coated titanium electrode. Each electrode had an area of 20 cm.$^2$. The space between the electrode was 1 mm. and contained a 20 cm.$^2$ piece of glass cloth so that the added liquid and glass cloth completely filled the cell. The current was drawn at a constant amperage of 25 ma. The cell yielded 2.75 watt minutes.

*Example 2.*—Ordinary paper towel was thoroughly wetted in a 50% solution of $KHSO_5$ which contained 1% $Na_4P_2O_7 \cdot 10H_2O$. The paper was air-dried. Each piece of paper 1½″ x 3″ contained 1.5 g. of the depolarizer mixture. Two of these dried, impregnated sheets were wetted and placed between a zinc and a platinum coated titanium electrode, each electrode being 1½″ by 3″ by ⅟₁₆″ thick. The cell was pressed tightly together to insure good contact. The cell yielded 0.7 watt minute. The output could be easily maintained constant for one hour, after which the yield slowly decreased until all of the $KHSO_5$ was consumed.

*Example 3.*—A cell containing a cation exchange membrane separating a magnesium electrode and a platinum coated titanium electrode, both with areas of 20 cm.$^2$, was charged with the following; one milliliter of water was placed between the magnesium electrode and the diaphragm and 1 ml. of a solution made up of 1 g. $KHSO_5$, .01 g. $Na_3PO_4$ and 5 g. $H_2O$ was charged to the area between the diaphragm and the indifferent electrode. The cell produced 3.5 watt minutes, the open circuit voltage was 2.70 v. and the closed circuit voltage was 1.75 v.

*Example 4.*—A cell prepared as in Example 3 was charged with 1 cc. $H_2O$, between Mg and diaphragm and 1 cc. of solution, consisting of 13 g. $H_2SO_4$ (48%) and 2 g. $H_2O_2$ (50%), between the diaphragm and the indifferent electrode. The open circuit voltage was 2.50 and the closed circuit voltage 2.20. The cell operated at 20 ma. current. The cell produced 3.2 watt minutes.

*Example 5.*—A cell, as described in Example 1, using a magnesium electrode and a platinum coated titanium electrode was charged with .3 g. of solid $KHSO_5$ and .06 g. solid $Na_3PO_4$. One cc. of water was added to the cell. Open circuit voltage was 2.65. Closed circuit voltage was 2.30. The cell operated at a 20 ma. current. The cell produced 2.4 watt minutes.

*Example 6.*—Several peroxygen chemicals and potassium chloride were compared to peroxymonosulfate as depolarizers. Each cell used in making the comparisons consisted of two electrodes each with a surface area of 20 cm.$^2$, separated by a rubber gasket 1 mm. thick. The negative electrode was either pure zinc metal or essentially pure magnesium metal. The inert electrode was platinum coated titanium. The same amount of each depolarizer, 0.3 gm. in each, was added to each cell. The cells using peroxydisulfate and peroxymonosulfate depolarizer also contained 0.06 gm. $Na_3PO_4$. One cubic centimeter of water was added to each cell and the open circuit voltage measured.

The following table contains a list of depolarizers and open circuit voltages of cells using the listed materials as depolarizer.

OPEN CIRCUIT VOLTAGES OF CELLS USING PEROXYGEN CHEMICALS AS DEPOLARIZER

| Depolarizer | Open Circuit Voltages | |
|---|---|---|
| | Zn-Pt | Mg-Pt |
| $KHSO_5$ | 1.9 | 2.6 |
| $KHSO_5$ [1] | 1.9 | 2.6 |
| Comparison Examples: | | |
| (a) $KCl$ | 0.5 | |
| (b) Sodium perborate | 0.35 | |
| (c) $K_4P_2O_8$ | 0.5 | |
| (d) $(NH_4)_2S_2O_8$ | 1.4 | 1.9 |
| (e) $Na_4P_2O_8$ | 0.5 | |
| (f) $Na_2H_2P_2O_8$ | | 1.9 |

[1] Sample did not contain phosphate.

Obviously, these examples could be multiplied indefinitely in view of the possible permutations and combinations with modifying additives known in the art, without departing from the scope of the invention as defined in the claims.

What is claimed is:

1. A primary electric cell comprising a zinc, zinc-base alloy, magnesium or magnesium-base alloy negative electrode and a positive electrode in contact with an ionizable peroxymonosulfate depolarizer.

2. The primary electric cell of claim 1 further comprising up to 30% by weight of an ionizable phosphate based on the weight of peroxymonosulfate depolarizer.

3. The primary electric cell of claim 2 in which the ionizable phosphate is selected from the group consisting of orthophosphates, pyrophosphates and peroxydiphosphates of potassium, sodium, ammonium and lithium.

4. The primary electric cell of claim 2 in which the negative electrode is zinc or a zinc-base alloy and the ionizable phosphate is present in the depolarizer in the amount of 0.5 to 1% based on the weight of the peroxymonosulfate.

5. The primary electric cell of claim 2 in which the negative electrode is magnesium or a magnesium-base alloy and the ionizable phosphate is present in the depolarizer in the amount of 3 to 5% based on the total weight of the peroxymonosulfate.

References Cited

UNITED STATES PATENTS

| | | | |
|---|---|---|---|
| 1,147,753 | 7/1915 | Schatzel | 136—137 XR |
| 1,771,190 | 7/1930 | Polcich | 136—137 |
| 2,952,572 | 9/1960 | Johnson | 136—154 |
| 3,121,028 | 2/1964 | Story | 136—137 XR |

WINSTON A. DOUGLAS, Primary Examiner

D. L. WALTON, Assistant Examiner

U.S. Cl. X.R.

136—107, 137